United States Patent
Sugiura et al.

(10) Patent No.: US 9,493,638 B2
(45) Date of Patent: Nov. 15, 2016

(54) RUBBER COMPOSITION FOR TIRE

(71) Applicant: The Yokohama Rubber Co., LTD., Minato-ku, Tokyo (JP)

(72) Inventors: Hiroki Sugiura, Hiratsuka (JP); Makoto Ashiura, Hiratsuka (JP); Masaki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/383,897

(22) PCT Filed: Mar. 8, 2013

(86) PCT No.: PCT/JP2013/056542
§ 371 (c)(1),
(2) Date: Sep. 8, 2014

(87) PCT Pub. No.: WO2013/133432
PCT Pub. Date: Sep. 12, 2013

(65) Prior Publication Data
US 2015/0126643 A1   May 7, 2015

(30) Foreign Application Priority Data

Mar. 8, 2012 (JP) ................................ 2012-051967
Aug. 31, 2012 (JP) ................................ 2012-192042

(51) Int. Cl.
*C08L 9/06* (2006.01)
*C08L 21/00* (2006.01)
*C08L 15/00* (2006.01)
*B60C 1/00* (2006.01)

(52) U.S. Cl.
CPC . *C08L 9/06* (2013.01); *B60C 1/00* (2013.01); *C08L 15/00* (2013.01); *C08L 21/00* (2013.01); *C08L 2205/025* (2013.01); *C08L 2205/03* (2013.01)

(58) Field of Classification Search
CPC combination set(s) only.
See application file for complete search history.

(56) References Cited

U.S. PATENT DOCUMENTS

| | | | |
|---|---|---|---|
| 5,929,149 A | 7/1999 | Matsuo et al. | |
| 6,608,145 B1 | 8/2003 | Lin et al. | |
| 7,700,693 B2 | 4/2010 | Karato et al. | |
| 2005/0043448 A1* | 2/2005 | Vasseur | B60C 1/0016 524/105 |
| 2007/0299197 A1 | 12/2007 | Lin et al. | |
| 2009/0326109 A1* | 12/2009 | Kameda | B60C 1/0016 524/110 |
| 2010/0016499 A1 | 1/2010 | Oshima | |
| 2010/0179274 A1* | 7/2010 | Jinbo | C08L 35/06 524/516 |
| 2010/0294407 A1 | 11/2010 | Kushida | |
| 2010/0324168 A1* | 12/2010 | Takizawa | C08L 9/06 523/150 |
| 2011/0294936 A1* | 12/2011 | Sato | B60C 1/0016 524/315 |
| 2011/0319519 A1* | 12/2011 | Sone | B60C 1/0016 523/155 |
| 2014/0011909 A1 | 1/2014 | Satou et al. | |
| 2016/0009843 A1* | 1/2016 | Sato | C08L 9/00 525/236 |

FOREIGN PATENT DOCUMENTS

| | | |
|---|---|---|
| DE | 697 04 605 | 8/2001 |
| DE | 11 2011 103 992 | 8/2013 |
| JP | 2004-511598 | 4/2004 |
| JP | 2004-231905 | 8/2004 |
| JP | 2005-263905 | 9/2005 |
| JP | 2007-534833 | 11/2007 |
| JP | 2009-091498 | 4/2009 |
| JP | 2010-126672 | 6/2010 |
| JP | 2010-270207 | 12/2010 |
| JP | 2011-032402 | 2/2011 |
| JP | 2011-052090 | 3/2011 |
| WO | WO 2012/073837 | 6/2012 |

OTHER PUBLICATIONS

Machine Translation of JP 2005263905.*
International Search Report dated May 21, 2013, 4 pages, Japan.
Safety Data Sheet, ZEOSIL Premium 200MP, Jan. 24, 2014, 11 pages, Rhodia Group, Solvay Japan, Ltd., Japan.

* cited by examiner

*Primary Examiner* — Nicole M Buie-Hatcher
(74) *Attorney, Agent, or Firm* — Thorpe North & Western

(57) ABSTRACT

The present technology provides a rubber composition for a tire which improves the low rolling resistance, dry performance, wet performance, and workability so as to surpass conventional levels. In the rubber composition for a tire according to the present technology, silica is blended into the composition in an amount of 90 to 150 parts by mass relative to 100 parts by mass of a diene rubber containing at least 25 mass % of a modified conjugated diene polymer rubber having a siloxane structure in at least some of the terminal-modifying groups. A silane coupling agent is blended into the composition in an amount of 3 to 20 mass % relative to the amount of silica, and an alkyltriethoxysilane having an alkyl group with 7 to 20 carbons is blended in an amount of 0.1 to 20 mass % relative to the amount of silica.

16 Claims, 4 Drawing Sheets

| | | Working Example 1 | Working Example 2 | Working Example 3 | Working Example 11 | Working Example 4 | Working Example 5 | Working Example 12 | Comparative Example 9 |
|---|---|---|---|---|---|---|---|---|---|
| Modified S-SBR (a) 1 | Part by mass | 50(40) | | 87.5(70) | 50(40) | 50(40) | 50(40) | 50(40) | 50(40) |
| Modified S-SBR (a) 2 | Part by mass | | 40 | | | | | | |
| E-SBR | Part by mass | 41.25(30) | 41.25(30) | | 41.25(30) | 41.25(30) | 41.25(30) | 41.25(30) | 41.25(30) |
| BR | Part by mass | 30 | 30 | 30 | 30 | 30 | 30 | 30 | 30 |
| Aroma oil | Part by mass | 8.75 | 18.75 | 12.5 | 8.75 | 8.75 | 8.75 | 8.75 | 8.75 |
| Silica 1 | Part by mass | 120 | 120 | 120 | 120 | 120 | 120 | 120 | 120 |
| Carbon black | Part by mass | 10 | 10 | 10 | 10 | 10 | 10 | 10 | 10 |
| Coupling agent | Part by mass | 9.6 | 9.6 | 9.6 | 9.6 | 9.6 | 9.6 | 9.6 | 9.6 |
| Terpene resin | Part by mass | | | | | | | | |
| Alkylsilane 2 | Part by mass | 3.6 | 3.6 | 3.6 | 0.1 | 1.2 | 7.2 | 24.0 | 32.5 |
| (oil amount + resin amount) | Part by mass | (30) | (30) | (30) | (30) | (30) | (30) | (30) | (30) |
| Workability | Index value | 89 | 85 | 94 | 99 | 97 | 78 | 72 | 90 |
| Dry performance | Index value | 109 | 103 | 115 | 103 | 105 | 113 | 118 | 98 |
| Wet performance | Index value | 112 | 105 | 119 | 104 | 106 | 118 | 120 | 107 |
| Rolling resistance | Index value | 87 | 91 | 79 | 97 | 95 | 81 | 78 | 86 |

| | | Working Example 6 | Working Example 7 | Working Example 8 | Working Example 9 | Working Example 10 | Comparative Example 10 | Comparative Example 11 | Working Example 13 | Working Example 14 | Comparative Example 12 |
|---|---|---|---|---|---|---|---|---|---|---|---|
| Modified S-SBR (a) 1 | Part by mass | 50(40) | 50(40) | 50(40) | 50(40) | 50(40) | 50(40) | 50(40) | 50(40) | 50(40) | 50(40) |
| Modified S-SBR (b) 4 | Part by mass | | | | 55(40) | 55(40) | | | | | |
| E-SBR | Part by mass | 41.25(30) | 41.25(30) | 41.25(30) | | | 41.25(30) | 41.25(30) | 41.25(30) | 41.25(30) | 41.25(30) |
| BR | Part by mass | 30 | 30 | 30 | 20 | 20 | 30 | 30 | 30 | 30 | 30 |
| Aroma oil | Part by mass | 8.75 | 8.75 | 3.75 | | 10 | 8.75 | 8.75 | 8.75 | 8.75 | 8.75 |
| Silica 1 | Part by mass | | 120 | | 120 | 120 | | | | | |
| Silica 2 | Part by mass | 120 | | 120 | | | 120 | 120 | 120 | 120 | 120 |
| Carbon black | Part by mass | 10 | 10 | 10 | 10 | 10 | 10 | 10 | 10 | 10 | 10 |
| Coupling agent | Part by mass | 9.6 | 9.6 | 9.6 | 9.6 | 9.6 | 0 | 2.4 | 3.6 | 24.0 | 32.5 |
| Terpene resin | Part by mass | | | 5 | 5 | 5 | | | | | |
| Alkylsilane 2 | Part by mass | 3.6 | 7.2 | 3.6 | 7.2 | 7.2 | 3.6 | 3.6 | 3.6 | 3.6 | 3.6 |
| (oil amount + resin amount) | Part by mass | (30) | (30) | (30) | (30) | (40) | (30) | (30) | (30) | (30) | (30) |
| Workability | Index value | 97 | 90 | 88 | 85 | 81 | 113 | 103 | 98 | 97 | 102 |
| Dry performance | Index value | 113 | 116 | 112 | 117 | 103 | 90 | 100 | 105 | 107 | 98 |
| Wet performance | Index value | 116 | 120 | 118 | 123 | 113 | 116 | 110 | 107 | 105 | 106 |
| Rolling resistance | Index value | 84 | 80 | 88 | 80 | 83 | 116 | 102 | 95 | 94 | 101 |

|  |  | Comparative Example 1 | Comparative Example 2 | Comparative Example 3 | Comparative Example 4 | Working Example 15 | Comparative Example 5 | Comparative Example 6 | Comparative Example 7 | Comparative Example 8 | Working Example 16 | Working Example 17 |
|---|---|---|---|---|---|---|---|---|---|---|---|---|
| Modified S-SBR (a) 1 | Part by mass |  |  |  | 18.75(15) | 38(30) | 50(40) | 50(40) | 50(40) | 50(40) | 50(40) | 50(40) |
| Modified S-SBR (b) 3 | Part by mass | 55(40) |  |  |  |  |  |  |  |  |  |  |
| S-SBR | Part by mass |  | 55(40) |  |  |  |  |  |  |  |  |  |
| F-SBR | Part by mass | 41.25(30) | 41.25(30) | 96.25(70) | 73.63(55) | 55.00(40) | 41.25(30) | 41.25(30) | 41.25(30) | 41.25(30) | 41.25(30) | 41.25(30) |
| BR | Part by mass | 30 | 30 | 30 | 30 | 30 | 30 | 30 | 30 | 30 | 30 | 30 |
| Aroma oil | Part by mass | 3.75 | 3.75 | 3.75 | 5.62 | 6.25 | 8.75 | 8.75 | 8.75 | 8.75 | 8.75 | 8.75 |
| Silica 1 | Part by mass | 120 | 120 | 120 | 120 | 120 | 120 | 120 | 80 | 160 | 90 | 145 |
| Carbon black | Part by mass | 10 | 10 | 10 | 10 | 10 | 10 | 10 | 10 | 10 | 10 | 10 |
| Coupling agent | Part by mass | 9.6 | 9.6 | 9.6 | 9.6 | 9.6 | 9.6 | 9.6 | 6.4 | 12.8 | 7.2 | 12 |
| Terpene resin | Part by mass |  |  |  |  |  |  | 3.6 |  |  |  |  |
| Alkylsilane 1 | Part by mass | 3.6 | 3.6 | 3.6 | 3.6 | 3.6 | 0 |  |  |  |  |  |
| Alkylsilane 2 | Part by mass |  |  |  |  |  | 0 |  | 2.4 | 4.8 | 2.7 | 4.5 |
| (oil amount + resin amount) | Part by mass | (30) | (30) | (30) | (30) | (30) | (30) | (30) | (30) | (30) | (30) | (30) |
| Workability | Index value | 100 | 107 | 80 | 85 | 100 | 112 | 102 | 71 | 115 | 87 | 91 |
| Dry performance | Index value | 100 | 103 | 91 | 98 | 101 | 102 | 101 | 94 | 118 | 107 | 111 |
| Wet performance | Index value | 100 | 102 | 93 | 101 | 103 | 100 | 102 | 96 | 121 | 114 | 118 |
| Rolling resistance | Index | 100 | 102 | 108 | 99 | 92 | 104 | 89 | 71 | 108 | 89 | 85 |

FIG. 3

| Common additive formulation | |
|---|---|
| Stearic acid | 2 parts by mass |
| Antioxidant | 2 parts by mass |
| Wax | 2 parts by mass |
| Zinc oxide | 2 parts by mass |
| Sulfur | 2 parts by mass |
| Vulcanization accelerator 1 | 2 parts by mass |
| Vulcanization accelerator 2 | 1.5 parts by mass |

FIG. 4

RUBBER COMPOSITION FOR TIRE

TECHNICAL FIELD

The present technology relates to a rubber composition for a tire, and more particularly to a rubber composition for a tire which improves the tire's low rolling resistance, dry performance, wet performance, and workability so as to surpass conventional levels.

BACKGROUND

As performance requirements for pneumatic tires are geared toward high-performance vehicles, a tire is required to have excellent grip performance when traveling on dry road surfaces and wet road surfaces as well as excellent fuel efficiency performance so as to accommodate increasing concerns regarding global environmental problems. As a result, by compounding silica in rubber compositions that form tread portions, dynamic viscoelastic characteristics of the tread rubber such as loss tangent (tan δ) and the like have been improved, heat build-up has been suppressed, rolling resistance reduced, and fuel consumption performance improved, while wet performance has been improved. However, silica tends to cause poor dispersion due to a lack of affinity with diene rubbers, and the expected effect of improving low rolling resistance and wet performance has not necessarily been sufficiently achieved. When the compounded amounts of silica and reinforcing fillers are reduced in order to improve the poor dispersion of silica and to ensure low heat generation, this induces a reduction in not only tire rigidity, but also dry grip performance and wet grip performance, so it has been difficult to achieve all of these performance requirements.

To resolve this problem, Japanese Unexamined Patent Application Publication No. 2009-091498A proposes improving the dispersibility of silica by compounding silica in a rubber composition with a terminal-modified solution polymerization styrene butadiene rubber where the terminals are modified by a polyorganosiloxane or the like, thereby reducing heat build-up (tan δ at 60° C.) and enhancing wet grip performance (tan δ at 0° C.). On the other hand, there have also been attempts to increase the silica compounded amount so as to achieve both low rolling resistance and wet grip performance by using various silane coupling agents in combination. However, when the compounded amount of a terminal-modified solution polymerization styrene-butadiene rubber or silica is increased, the viscosity of the rubber composition increases, which leads to the problem of deteriorated workability.

Accordingly, it has been difficult to dramatically improve the low rolling resistance, dry performance, and wet performance while maintaining excellent workability.

SUMMARY

The present technology provides a rubber composition for a tire which improves the low rolling resistance, dry performance, wet performance, and workability so as to surpass conventional levels.

The rubber composition for a tire according to the present technology comprises silica that is blended in an amount of 90 to 150 parts by mass per 100 parts by mass of a diene rubber containing at least 25 mass % of modified conjugated diene polymer rubber (a) having a siloxane structure in at least some of the terminal-modifying groups, and a silane coupling agent is blended in an amount of 3 to 20 mass % relative to the amount of silica described above, while an alkyltriethoxysilane having an alkyl group with 7 to 20 carbons is blended in an amount of 0.1 to 20 mass % relative to the amount of silica described above.

In the rubber composition for a tire according to the present technology, the diene rubber contains at least 25 mass % of modified conjugated diene polymer rubber (a) having a siloxane structure in at least some of the terminal-modifying groups, and a silane coupling agent is blended into silica, so the affinity of the diene rubber and silica is enhanced and the dispersibility of the silica is improved, which makes it possible to reduce heat generation so as to reduce rolling resistance and improve dry performance and wet performance. In addition, since an alkyltriethoxysilane having an alkyl group with 7 to 20 carbons is blended into the composition, even if the compounded amount of silica is as large as 90 to 150 parts by mass, it is possible to maintain good heat generation, to suppress increases in the viscosity of the rubber composition, and to ensure good workability.

The siloxane structure may be a structure originating from at least one type of a siloxane compound selected from general formulas (I) to (III) below (for example, a structure containing at least one type of a siloxane compound selected from general formulas (I) to (III) below).

[Formula 1]

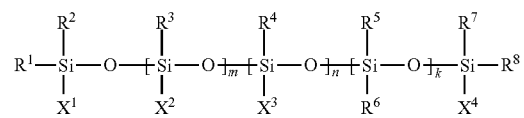

(I)

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group having from 2 to 20 repeating alkylene glycol units, a portion of the $X^3$ optionally being a group derived from a group including from 2 to 20 repeating alkylene glycol units; and m is an integer from 3 to 200, n is an integer from 0 to 200, and k is an integer from 0 to 200.

[Formula 2]

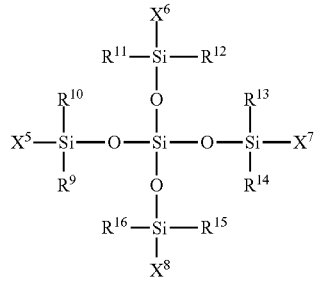

(II)

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain.

[Formula 3]

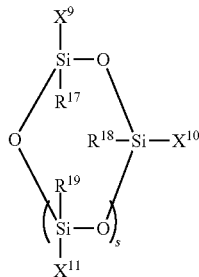

(III)

In formula (III), $R^{17}$ to $R^{19}$ are identical or different and are alkyl groups having from 1 to 6 carbons or aryl groups having from 6 to 12 carbons; and $X^9$ to $X^{11}$ are groups having functional groups that react with the active terminal of the active conjugated diene polymer chain; and s is an integer from 1 to 18.

The modified conjugated diene polymer rubber (a) described above has aromatic vinyl units, and the content of the aromatic vinyl units is from 15 to 48 mass %. As a result, the modified conjugated diene polymer rubber (a) forms a fine phase separation structure, so the terminal-modifying groups efficiently act on the silica, which makes it possible to further improve the dispersibility of the silica and to dramatically reduce the low rolling resistance of the pneumatic tire so as to further improve the dry performance and the wet performance.

The silica preferably has a nitrogen specific surface area ($N_2SA$) of 194 to 225 $m^2/g$, a CTAB specific surface area (CTAB) of 170 to 210 $m^2/g$, a DBP absorption of at least 190 mL/100 g, and an $N_2SA$-to-CTAB ratio ($N_2SA/CTAB$) of 0.9 to 1.4. By blending such a silica into the composition, the dispersibility and reinforcing properties of the silica are optimized, and the affinity with the modified conjugated diene polymer rubber (a) is further improved, which makes it possible to further reduce the rolling resistance and further increase the dry performance and wet performance.

In addition, it is preferable to blend 3 to 20 parts by mass of an aromatic modified terpene resin having a softening point of 100 to 150° C. into 100 parts by mass of the diene rubber, which makes it possible to further improve the wet performance and, in particular, the steering stability on wet road surfaces while maintaining excellent low rolling resistance.

Furthermore, the diene rubber may contain 40 to 75 mass % of a terminal-modified conjugated diene polymer rubber (b) having a functional group with reactivity to a silanol group, and this terminal-modified conjugated diene polymer rubber (b) may have an aromatic vinyl unit content of 25 to 40 mass %, a vinyl unit content of 36 to 65 mass %, a glass transition temperature of −40 to −22° C., a weight average molecular weight (Mw) of 900,000 to 1,400,000, and a ratio (Mw/Mn) of the weight average molecular weight (Mw) and the number average molecular weight (Mn) of at least 2.3. By containing a terminal-modified conjugated diene polymer rubber (b) having such characteristics, it is possible to further enhance the dry performance and wet performance while further reducing the rolling resistance and to further improve the workability.

The rubber composition contains an oil and/or an aromatic modified terpene resin, and the total amount of the oil and/or the aromatic modified terpene resin in the rubber composition is preferably at most 40 parts by mass per 100 parts by mass of the diene rubber. This makes it possible to further increase the level of steering stability on dry and wet road surfaces.

A pneumatic tire using this rubber composition for the tread part of the tire is able to improve the low rolling resistance, dry performance, wet performance, and workability so as to surpass conventional levels.

BRIEF DESCRIPTION OF THE DRAWINGS

FIG. 1 illustrates the blending and evaluation of each composition of the working examples of the present technology and the comparative examples.

FIG. 2 illustrates the blending and evaluation of each composition of the working examples of the present technology and the comparative examples.

FIG. 3 illustrates the blending and evaluation of each composition of the working examples of the present technology and the comparative examples.

FIG. 4 illustrates the common components used in each composition of the working examples of the present technology and the comparative examples.

DETAILED DESCRIPTION

In the rubber composition for a tire according to the present technology, the rubber component is a diene rubber, and the diene rubber necessarily contains a modified conjugated diene polymer rubber (a). The modified conjugated diene polymer rubber (a) is a conjugated diene polymer rubber produced by solution polymerization so as to have functional groups at the terminals of the molecular chains. By blending a modified conjugated diene polymer rubber (a) into the composition, the affinity with silica is enhanced and the dispersibility is improved. Therefore, the effect of the silica is further improved, so the low rolling resistance and wet performance are improved, and the dry performance is secured.

In the present technology, the backbone of the modified conjugated diene polymer is composed of a polymer obtained by polymerizing a conjugated diene monomer or a copolymer obtained by copolymerizing a conjugated diene monomer and an aromatic vinyl monomer. A copolymer of a conjugated diene monomer and an aromatic vinyl monomer is preferable. Examples of the conjugated diene monomer unit include 1,3-butadiene, isoprene(2-methyl-1,3-butadiene), 2,3-dimethyl-1,3-butadiene, 2-chloro-1,3-butadiene, 1,3-pentadiene, and the like. Examples of the aromatic vinyl monomer unit include styrene, 2-methylstyrene, 3-methylstyrene, 4-methylstyrene, alpha-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine, and the like.

The terminals of the conjugated diene polymer backbone are preferably formed from isoprene unit blocks. By forming the terminals from isoprene unit blocks, the affinity of the modified conjugated diene polymer and silica improves when the terminals are modified and the silica is blended into the composition, which improves the low heat generation, wet performance, and wear resistance. Accordingly, when the conjugated diene monomer units constituting the polymer contain a conjugated diene other than isoprene units, it is preferable to introduce the isoprene unit blocks into the polymer terminals by adding isoprene to a solution containing a polymer having active terminals before adding a compound having a siloxane structure or, when reacting the compound in multiple stages or reacting the same or different compounds sequentially, as described below, while dividing and adding these compounds.

In the present technology, the conjugated diene polymer is prepared by copolymerizing the conjugated diene monomer unit and the aromatic vinyl monomer unit described above in a hydrocarbon solvent, using an organic active metal compound as an initiator. It is sufficient that the hydrocarbon solvent be a commonly used solvent, and examples thereof include cyclohexane, n-hexane, benzene, toluene, and the like.

The organic active metal catalyst to be used is preferably an organic alkali metal compound, and examples thereof include organic monolithium compounds such as n-butyllithium, sec-butyllithium, t-butyllithium, hexyl lithium, phenyl lithium, and stilbene lithium; organic polyhydric lithium compounds such as dilithiomethane, 1,4-dilithiobutane, 1,4-dilithio-2-ethylcyclohexane, and 1,3,5-trilithiobenzene; organic sodium compounds such as sodium naphthalene; and organic potassium compounds such as potassium naphthalene. Additionally, 3,3-(N,N-dimethylamino)-1-propyl lithium, 3-(N,N-diethylamino)-1-propyl lithium, 3-(N,N-dipropylamino)-1-propyl lithium, 3-morpholino-1-propyl lithium, 3-imidazole-1-propyl lithium, and organic lithium compounds having their chains extended by 1 to 10 units of butadiene, isoprene, or styrene; and the like can be used.

In the polymerization reaction, a polar aprotic compound such as an ether such as diethylether, diethylene glycol dimethylether, tetrahydrofuran, and 2,2-bis(2-oxolanyl)propane, or an amine such as triethylamine, and tetramethyl ethylenediamine may also be added for the purpose of randomly copolymerizing the aromatic vinyl monomer units and the conjugated diene monomer units.

In the present technology, the modified conjugated diene polymer rubber (a) has a siloxane structure in at least some of the terminal-modifying groups. The terminal-modifying groups are generated by bonding at least one compound having a siloxane structure to the active terminals of the active conjugated diene polymer chain described above.

Here, the compound having a siloxane structure capable of reacting with the active terminals of an active conjugated diene polymer chain should be bonded with at least one active conjugated diene polymer chain, and one or more active conjugated diene polymer chains can be bonded to a single compound. That is, the modified conjugated diene polymer rubber (a) used in the present technology, can contain a modified rubber having modifying groups at both terminals of a conjugated diene polymer, a modified rubber in which the modifying groups are optionally bonded to one or more other conjugated diene polymers, and a mixture of a plurality of these modified rubbers. In addition, the reaction between the active terminals of an active conjugated diene polymer chain and a compound having a siloxane structure at these active terminals can be carried out in one stage or in multiple stages. Moreover, an identical or different compound may be sequentially reacted.

In the present technology, examples of the compound having a siloxane structure capable of reacting with the active terminals of the active conjugated diene polymer chain include polysiloxane compounds and polyorganosiloxane compounds. Among these, polyorganosiloxane compounds are preferable. One of these compounds or combinations of a plurality of these compounds can be attached to the polymer. Furthermore, other compounds other than compounds having a siloxane structure can be reacted with the active terminals of the active conjugated diene polymer chain in combination with a compound having a siloxane structure. Other compounds other than compounds having a siloxane structure will be described below.

The polyorganosiloxane compound is preferably a compound represented by general formulas (I) to (III) below. That is, the compound having a siloxane structure capable of reacting with the active terminals of the active conjugated diene polymer chain should contain at least one type selected from these polyorganosiloxane compounds and may contain a combination of a plurality of types of compounds. In addition, these polyorganosiloxane compounds and other compounds capable of reacting with the active terminals of the active conjugated diene polymer chain may be combined.

[Formula 4]

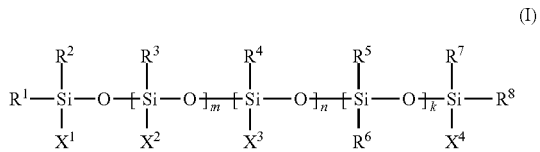

(I)

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group having from 2 to 20 repeating alkylene glycol units, a portion of the $X^3$ optionally being groups derived from groups having from 2 to 20 repeating alkylene glycol units; and m is an integer from 3 to 200, n is an integer from 0 to 200, and k is an integer from 0 to 200.

[Formula 5]

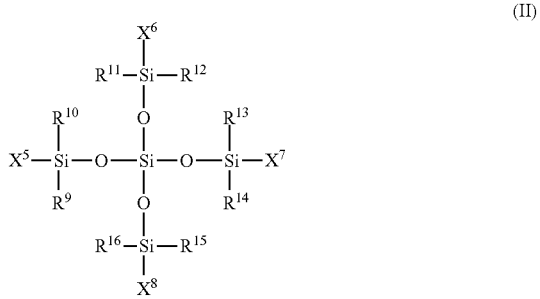

(II)

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain.

[Formula 6]

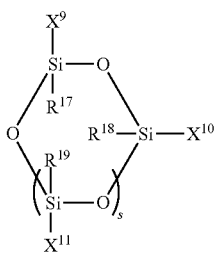

(III)

In formula (III), $R^{17}$ to $R^{19}$ are identical or different and are alkyl groups having from 1 to 6 carbons or aryl groups having from 6 to 12 carbons; $X^9$ to $X^{11}$ are groups having functional groups that react with the active terminal of the active conjugated diene polymer chain; and s is an integer from 1 to 18.

Examples of the alkyl groups having from 1 to 6 carbons that constitute the $R^1$ to $R^8$, $X^1$, and $X^4$ in the polyorganosiloxane represented by general formula (I) above include methyl groups, ethyl groups, n-propyl groups, isopropyl groups, butyl groups, pentyl groups, hexyl groups, cyclohexyl groups, and the like. Examples of the aryl groups having from 6 to 12 carbons include phenyl groups, methylphenyl groups, and the like. Among these alkyl groups and aryl groups, methyl groups are particularly preferable.

Examples of the group having the functional group, which reacts with the active terminal of the polymer chain, constituting the $X^1$, $X^2$, and $X^4$ in the polyorganosiloxane represented by general formula (I) include alkoxyl groups having from 1 to 5 carbons, hydrocarbon groups containing a 2-pyrrolidonyl group, and epoxy group-containing groups having from 4 to 12 carbons.

Examples of the alkoxyl groups having from 1 to 5 carbons constituting the $X^1$, $X^2$, and $X^4$ include methoxy groups, ethoxy groups, propoxy groups, isopropoxy groups, butoxy groups, and the like. Among these, methoxy groups are preferable. In cases where at least one of the $X^1$, $X^2$, and $X^4$ is the alkoxyl group having from 1 to 5 carbons, when the polyorganosiloxane having the alkoxyl group is reacted with the active terminal of the active conjugated diene polymer chain, linkage between the silicon atom and the oxygen atom of the alkoxyl group breaks and the active conjugated diene polymer chain attaches directly to the silicon atom, thus forming a single bond.

Preferable examples of the hydrocarbon group containing a 2-pyrrolidonyl group constituting the $X^1$, $X^2$, and $X^4$ include the groups represented by general formula (IV) below.

[Formula 7]

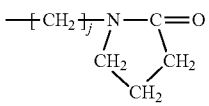

(IV)

In formula (IV), j is an integer from 2 to 10. j is particularly preferably 2.

Thus, when the polyorganosiloxane, in which at least one of the $X^1$, $X^2$, and $X^4$ comprises the hydrocarbon group containing the 2-pyrrolidonyl group, is reacted with the active terminal of the active conjugated diene polymer chain, the carbon-oxygen bond in the carbonyl group constituting the 2-pyrrolidonyl group breaks and a structure is formed in which the polymer chain is bonded to the carbon atom.

Preferable examples of the epoxy group-containing group having from 4 to 12 carbons constituting the $X^1$, $X^2$, and $X^4$ include the groups represented by general formula (V) below.

ZYE General formula (V):

In formula (V), Z is an alkylene group or an alkyl arylene group having from 1 to 10 carbons; Y is a methylene group, a sulfur atom, or an oxygen atom; and E is an epoxy group-containing hydrocarbon group having from 2 to 10 carbons. Among these, preferably Y is an oxygen atom; more preferably Y is an oxygen atom and E is a glycidyl group; and even more preferably Z is an alkylene group having three carbons, Y is an oxygen atom, and E is a glycidyl group.

In the polyorganosiloxane represented by general formula (I), in cases where at least one of the $X^1$, $X^2$, and $X^4$ is an epoxy group-containing group having from 4 to 12 carbons, when the polyorganosiloxane is reacted with the active terminal of the active conjugated diene polymer chain, the carbon-oxygen bond forming the epoxy ring breaks and a structure is formed in which the polymer chain is bonded to the carbon atom.

In the polyorganosiloxane represented by general formula (I), of the above, $X^1$ and $X^4$ are preferably epoxy group-containing groups having from 4 to 12 carbons or alkyl group having from 1 to 6 carbons. Additionally, $X^2$ is preferably an epoxy group-containing group having from 4 to 12 carbons.

In the polyorganosiloxane represented by general formula (I), $X^3$ is a group having from 2 to 20 repeating alkylene glycol units. A group represented by general formula (VI) below is preferable as a group having from 2 to 20 repeating alkylene glycol units.

[Formula 8]

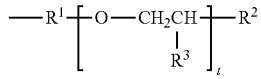

(VI)

In formula (VI), t is an integer from 2 to 20, $R^1$ is an alkylene group or an alkyl arylene group having from 2 to 10 carbons, $R^3$ is a hydrogen atom or a methyl group, and $R^2$ is an alkoxyl group or an aryloxy group having from 1 to 10 carbons. Among these, preferably, t is an integer from 2 to 8, $R^1$ is an alkylene group having three carbons, $R^3$ is a hydrogen atom, and $R^2$ is a methoxy group.

In the polyorganosiloxane represented by general formula (II), $R^9$ to $R^{16}$ are identical or different and are alkyl groups having from 1 to 6 carbons or aryl groups having from 6 to 12 carbons. $X^5$ to $X^8$ are groups having functional groups that react with the active terminal of the polymer chain.

In the polyorganosiloxane represented by general formula (III), $R^{17}$ to $R^{19}$ are identical or different and are alkyl groups having from 1 to 6 carbons or aryl groups having from 6 to 12 carbons. $X^9$ to $X^{11}$ are groups having functional groups that react with the active terminal of the polymer chain. s is an integer from 1 to 18.

In the polyorganosiloxane represented by general formula (II) and general formula (III) above, the alkyl group having from 1 to 6 carbons, the aryl group having from 6 to 12 carbons, and the group having the functional group that reacts with the active terminal of the polymer chain are synonymous with those recited for the polyorganosiloxane represented by general formula (I).

Examples of other compounds other than compounds having a siloxane structure to be reacted with the active terminals of the active conjugated diene polymer chain in combination with a compound having a siloxane structure include tin compounds, silicon compounds, silane compounds, amide compounds and/or imide compounds, isocyanate and/or isothiocyanate compounds, ketone compounds, ester compounds, vinyl compounds, oxirane compounds, thiirane compounds, oxetane compounds, polysulfide compounds, siloxane compounds, polyether compounds, polyene compounds, halogen compounds, and compounds having fullerenes or the like. One of these compounds or combinations of a plurality of these compounds can be attached to the polymer.

Specific examples of the compound that is reactable with the active terminal of the active conjugated diene polymer chain include polyglycidyl ethers of polyhydric alcohol such as ethylene glycol diglycidyl ether and glycerin triglycidyl ether; polyglycidyl ethers of aromatic compounds having two or more phenol groups such as bisphenol A diglycidylate; polyepoxy compounds such as 1,4-diglycidyl benzene, 1,3,5-triglycidyl benzene, and polyepoxidized liquid polybutadiene; epoxy group-containing tertiary amines such as 4,4'-diglycidyl-diphenyl methylamine and 4,4'-diglycidyl-dibenzyl methylamine; diglycidyl amino compounds such as diglycidyl aniline, diglycidyl-o-toluidine, tetraglycidyl metaxylene diamine, tetraglycidyl amino diphenylmethane, tetraglycidyl-p-phenylenediamine, diglycidyl amino methylcyclohexane, and tetraglycidyl-1,3-bis amino methylcyclohexane; and the like.

Examples of the silicon compound include tetrachlorosilicon, tetrabromosilicon, methyltrichlorosilicon, butyltrichlorosilicon, dichlorosilicon, bis(trichlorosilyl)silicon, and the like.

Examples of the tin compound include tetrachlorostannate, tetrabromostannate, methyltrichlorostannate, butyltrichlorostannate, dichlorostannate, bis(trichlorosilyl)stannate, and the like.

Examples of the silane compound include silane compounds having at least one selected from an alkoxy group, a phenoxy group, and a halogen. Examples of such silane compounds include dimethoxy dimethylsilane, diphenoxy dimethylsilane, diethoxy diethylsilane, triphenoxy methylsilane, triphenoxy vinylsilane, trimethoxy vinylsilane, triethoxy vinylsilane, tri(2-methylbutoxy)ethylsilane, tri(2-methylbutoxy)vinylsilane, triphenoxy phenylsilane, tetraphenoxysilane, tetraethoxysilane, tetramethoxysilane, tetrakis(2-ethylhexyloxy)silane, phenoxydivinyl chlorosilane, methoxybiethyl chlorosilane, diphenoxymethyl chlorosilane, diphenoxyphenyl iodosilane, diethoxymethyl chlorosilane, dimethoxymethyl chlorosilane, trimethoxy chlorosilane, triethoxy chlorosilane, triphenoxy chlorosilane, tris(2-ethylhexyloxy)chlorosilane, phenoxymethyl dichlorosilane, methoxyethyl dichlorosilane, ethoxymethyl dichlorosilane, phenoxyphenyl diiodosilane, diphenoxy dichlorosilane, dimethoxy dichlorosilane, bis(2-methylbutoxy)dibromosilane, bis(2-methylbutoxy)dichlorosilane, diethoxy dichlorosilane, methoxy trichlorosilane, ethoxy trichlorosilane, phenoxy trichlorosilane, (2-ethylhexyloxy) trichlorosilane, (2-methylbutoxy)trichlorosilane, and the like.

Additionally, aside from the functional groups described above, the silane compound can have a glycidyl group, an epoxy group, a methacryloxy group, and the like. Examples of such silane compounds include γ-glycidoxyethyl trimethoxysilane, γ-glycidoxypropyl trimethoxysilane, γ-glycidoxybutyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, γ-glycidoxypropyl methyldimethoxysilane, γ-glycidoxypropyl ethyldimethoxysilane, γ-glycidoxypropyl ethyldiethoxysilane, γ-glycidoxypropyl methyldiethoxysilane, γ-glycidoxypropyl methyldipropoxysilane, γ-glycidoxypropyl methyldibutoxysilane, γ-glycidoxypropyl methyldiphenoxysilane, γ-glycidoxypropyl dimethylmethoxysilane, γ-glycidoxypropyl diethylethoxysilane, γ-glycidoxypropyl dimethylethoxysilane, γ-glycidoxypropyl dimethylphenoxysilane, γ-glycidoxypropyl diethylmethoxysilane, γ-glycidoxypropyl methyldiisopropeneoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl) dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyl trimethoxysilane, γ-methacryloxypropyl triethoxysilane, γ-methacryloxymethyl trimethoxysilane, γ-methacryloxyethyl triethoxysilane, bis(γ-methacryloxypropyl)dimethoxysilane, tris(γ-methacryloxypropyl)methoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, β-(3,4-epoxycyclohexyl)ethyl-methyldiisopropeneoxysilane, and the like.

Examples of the isocyanate compound or isothiocyanate compound include aromatic polyisocyanate compounds such as 2,4-tolylene diisocyanate, 2,6-tolylene diisocyanate, diphenylmethane diisocyanate, naphthalene diisocyanate, tolidine diisocyanate, triphenylmethane triisocyanate, p-phenylene diisocyanate, tris(isocyanatephenyl)thiophosphate, xylylene diisocyanate, benzene-1,2,4-triisocyanate, naphthalene-1,2,5,7-tetraisocyanate, naphthalene-1,3,7-triisocyanate, phenylisocyanate, hexamethylene diisocyanate, methylcyclohexane diisocyanate, phenyl-1,4-diisothiocyanate, 2,4-tolylene diisocyanate, diphenylmethane diisocyanate, naphthalene diisocyanate, and the like.

Further examples include N-substituted aminoketones such as 4-dimethylaminobenzophenone, 4-diethylaminobenzophenone, 4-di-t-butylaminobenzophenone, 4-diphenylaminobenzophenone, 4,4'-bis(dimethylamino)benzophenone, 4,4'-bis(diethylamino)benzophenone, 4,4'-bis(di-t-butylamino)benzophenone, 4,4'-bis(diphenylamino)benzophenone, 4,4'-bis(divinylamino)benzophenone, 4-dimethylaminoacetophenone, 4-diethylaminoacetophenone, 1,3-bis(diphenylamino)-2-propanone, and 1,7-bis(methylethylamino)-4-heptanone, and corresponding N-substituted aminothioketones; N-substituted aminoaldehydes such as 4-diethylaminobenzaldehyde and 4-divinylaminobenzaldehyde, and corresponding N-substituted aminothioaldehydes; N-substituted lactams such as N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenyl-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurolactam, N-phenyl-ω-laurolactam, N-t-butyl-ω-laurolactam, N-vinyl-ω-laurolactam, and N-benzyl-ω-laurolactam, and corresponding thiolactams; N-substituted ethylene ureas such as 1,3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-ethyl-2-imidazolidinone, 1-methyl-3-(2-ethoxyethyl)-2-imidazolidinone, and 1,3-dimethyl-3,4,5,6-tetrahydropyrimidinone, and corresponding N-substituted thioethylene ureas; benzophenones having at least one amino group, alkylamino group, or dialkylamino group on one or both of the benzene rings, such as 4,4'-bis(dimethylamino)-benzophenone, 4,4'-bis(diethylamino)-benzophenone, 4,4'-bis(dibutylamino)-benzophenone, 4,4'-diaminobenzophenone, and 4-dimethylaminobenzophenone, and corresponding thiobenzophenones.

A compound represented by general formula (VII) below is preferable as a silicon compound containing a halogen atom and/or an alkoxy group, and the bonding of a plurality of active conjugated diene polymer chains to one molecule of this compound is thus facilitated.

[Formula 9]

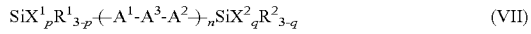

(VII)

In formula (VII), $X^1$ and $X^2$ are halogen atoms or alkoxy groups having from 1 to 20 carbons. p and q are each independently integers from 0 to 3 and the total number of halogen atoms and alkoxy groups having from 1 to 20 carbons in the compound represented by formula (VII) is not less than 5. $R^1$ and $R^2$ are each monovalent hydrocarbon groups having from 1 to 20 carbons. n is an integer from 0 to 20, and $A^1$ and $A^2$ are each independently divalent hydrocarbons having a single bond or from 1 to 20 carbons. $A^3$ is a divalent group represented by the formula —$(SiX^3_rR^3_{2-r})_m$—, —$NR^4$—, or —$N(-A^4-SiX^4_sR^5_{3-s})$—. $X^3$ and $X^4$ are halogen atoms or alkoxy groups having from 1 to 20 carbons. $R^3$ and $R^5$ are monovalent hydrocarbon groups having from 1 to 20 carbons. $R^4$ is a hydrogen atom or a monovalent hydrocarbon group having from 1 to 20 carbons. $A^4$ is a divalent hydrocarbon group having a single bond or from 1 to 20 carbons. r is an integer from 0 to 2, and m is an integer from 0 to 20. s is an integer from 0 to 3.

Examples of the compound represented by general formula (VII) include halogenated silicon compounds such as hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane; alkoxysilane compounds such as hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)cyclohexane, bis(triethoxysilyl)cyclohexane, bis(triethoxysilyl)benzene, bis(trimethoxysilyl)octane, bis(triethoxysilyl)octane, bis(trimethoxysilyl)nonane, bis(triethoxysilyl)nonane, bis(trimethoxysilyl)ethylene, bis(triethoxysilyl)ethylene, bis(trimethoxysilylethyl)benzene, bis(triethoxysilylethyl)benzene, bis(3-trimethoxysilylpropyl)ethane, and bis(3-triethoxysilylpropyl)ethane; alkoxysilane compounds containing amino groups, such as bis(3-trimethoxysilylpropyl)methylamine, bis(3-triethoxysilylpropyl)methylamine, bis(3-trimethoxysilylpropyl)ethylamine, bis(3-triethoxysilylpropyl)ethylamine, bis(3-trimethoxysilylpropyl)propylamine, bis(3-triethoxysilylpropyl)propylamine, bis(3-trimethoxysilylpropyl)butylamine, bis(3-triethoxysilylpropyl)butylamine, bis(3-trimethoxysilylpropyl)phenylamine, bis(3-triethoxysilylpropyl)phenylamine, bis(3-trimethoxysilylpropyl)benzylamine, bis(3-triethoxysilylpropyl)benzylamine, bis(trimethoxysilylmethyl)methylamine, bis(triethoxysilylmethyl)methylamine, bis(2-trimethoxysilylethyl)methylamine, bis(2-triethoxysilylethyl)methylamine, bis(triethoxysilylmethyl)propylamine, and bis(2-triethoxysilylethyl)propylamine; and alkoxysilane compounds containing amino groups, such as tris(trimethoxysilylmethyl)amine, tris(2-triethoxysilylethyl)amine, tris(3-trimethoxysilylpropyl)amine, and tris(3-triethoxysilylpropyl).

Furthermore, a terminal-modifying group at least partially having a siloxane structure produced by the reaction described above has a functional group which interacts with silica. This functional group that interacts with silica may be the functional group included in the structure of the compound described above. The functional group may also be a functional group that is obtained as a result of the reaction between the compound and the active terminal. The functional group which interacts with silica is not particularly limited, but examples thereof include alkoxysilyl groups, hydroxyl groups (including an organosiloxane structure), aldehyde groups, carboxyl groups, amino groups, imino groups, epoxy groups, amide groups, thiol groups, and ether groups. Among these, the hydroxyl group (including an organosiloxane structure) is preferable. Thus, the terminal-modifying group includes the functional group that interacts with silica and, therefore, affinity with silica is further enhanced, which leads to significant improvement in dispersibility.

The modified conjugated diene polymer rubber used in the present technology has aromatic vinyl units. The aromatic vinyl unit content is preferably from 15 to 48 mass % and more preferably from 15 to 45 mass %. The aromatic vinyl unit content is, for example, from 23 to 28 mass %, from 28 to 38 mass %, from 38 to 42 mass %, or from 42 to 45 mass %. When the aromatic vinyl unit content of the modified conjugated diene polymer rubber (a) is in such a range, it is possible to achieve both wet performance and dry performance when the rubber composition is used in a pneumatic tire. When the aromatic vinyl unit content of the modified conjugated diene polymer rubber (a) is less than 15 mass %, it is not possible to secure sufficient grip performance. When the aromatic vinyl unit content of the modified conjugated diene polymer rubber (a) exceeds 48 mass %, the glass transition temperature (Tg) of the conjugated diene polymer rubber increases and the balance of viscoelastic characteristics diminishes, which makes it difficult to achieve the effect of reducing heat generation. The aromatic vinyl unit content of the modified conjugated diene polymer rubber (a) is measured by infrared spectrophotometric analysis (Hampton method).

In the present technology, the vinyl unit content of the modified conjugated diene polymer rubber (a) is preferably from 20 to 75 mass % and more preferably from 26 to 70 mass %. In this specification, referring simply to vinyl units, the glass transition temperature (Tg) of the modified conjugated diene polymer rubber (a) can be optimized by setting the vinyl unit content of the modified conjugated diene polymer rubber (a), which refers to conjugated diene units, to 20 to 75 mass %. When the vinyl unit content of the modified conjugated diene polymer rubber (a) is less than 20 mass %, the Tg of the modified conjugated diene polymer rubber (a) decreases, and the loss tangent (tan δ) of the dynamic viscoelastic characteristics at 0° C., which is an index of wet performance, decreases. In addition, when the vinyl unit content of the modified conjugated diene polymer rubber exceeds 75 mass %, there is a possibility that the vulcanization rate may decrease or that the strength or rigidity may decrease. The vinyl unit content of the modified conjugated diene polymer rubber (a) is measured by infrared spectrophotometric analysis (Hampton method).

In the present technology, the concentration of the terminal-modifying groups in the modified conjugated diene polymer rubber (a) is determined by the relationship with the mass average molecular weight (Mw) of the modified conjugated diene polymer rubber (a). The weight average molecular weight of the modified conjugated diene polymer rubber (a) is preferably from 350,000 to 1,000,000 and more preferably from 400,000 to 850,000. When the weight average molecular weight of the modified conjugated diene polymer rubber (a) is less than 600,000, the modified group concentration at the terminals of the modified conjugated diene polymer rubber (a) increases and the dispersibility of silica in the rubber composition improves, but since the molecular weight of the polymer itself is low, it is not possible to sufficiently achieve the effect of improving the strength and rigidity, which may lead to insufficient steering stability or wear resistance or a small scope of improvement in viscoelastic properties. In addition, when the weight average molecular weight of the modified conjugated diene polymer rubber (a) exceeds 1,000,000, the modified group concentration at the terminals of the modified conjugated diene polymer rubber (a) decreases and the affinity with silica becomes insufficient, which diminishes the dispersibility, and this leads to an insufficient effect of reducing the rolling resistance or insufficient wet performance. The weight average molecular weight (Mw) of the modified conjugated diene polymer rubber (a) is measured by gel permeation chromatography (GPC) based on standard polystyrene conversion.

The modified conjugated diene polymer rubber (a) can improve the molding workability of the rubber composition by means of oil extension. The amount of oil extension is not particularly limited but is preferably at most 25 parts by mass per 100 parts by mass of the modified conjugated diene polymer rubber (a). When the amount of oil extension of the modified conjugated diene polymer rubber (a) exceeds 25 parts by mass, the degree of freedom for the composition design is decreased when blending an oil, a softening agent, a tackifier, or the like into the rubber composition.

In addition, the glass transition temperature (Tg) of the modified conjugated diene polymer rubber (a) is not particularly limited but is preferably adjusted to −20° C. to −65° C. When the Tg of the modified conjugated diene polymer rubber (a) is within such a range, it is possible to secure the steering stability and to reduce the rolling resistance. Additionally, by configuring the Tg to be within this range, the wet grip performance can be ensured. The glass transition temperature (Tg) of the modified conjugated diene polymer rubber (a) is determined by measuring a thermogram by differential scanning calorimetry (DSC) under conditions with a rate of temperature increase of 20° C./min and then taking the temperature at the middle of the transition range. When the modified conjugated diene polymer rubber (a) is an oil-extended product, the glass transition temperature of the modified conjugated diene polymer rubber (a) in a state not containing an oil extension component (oil) is used.

In the present technology, the content of the modified conjugated diene polymer rubber (a) is at least 25 mass %, preferably at least 30 mass %, and more preferably at least 35 mass % relative to 100 mass % of the diene rubber. For example, the content is from 35 to 40 mass % or from 40 to 70 mass %. When the content of the modified conjugated diene polymer rubber (a) is less than 25 mass % of the diene rubber, the affinity with silica decreases, which leads to deteriorated dispersibility of silica, and the balance between wet performance and rolling resistance is thereby deteriorated.

The rubber composition for a tire according to the present technology can contain a diene rubber other than the modified conjugated diene polymer rubber (a) as a rubber component. Examples of other diene rubbers include natural rubber, isoprene rubber, butadiene rubber, solution polymerization styrene-butadiene rubber (S-SBR), emulsion polymerization styrene-butadiene rubber (E-SBR), butyl rubber, and halogenated butyl rubber. Natural rubber, isoprene rubber, butadiene rubber, solution polymerization styrene-butadiene rubber, and emulsion polymerization styrene-butadiene rubber are preferable. Here, solution polymerization styrene-butadiene rubber is composed of S-SBR without terminal modification and modified S-SBR other than the modified conjugated diene polymer rubber (a) of the present technology. A single rubber may be used or multiple rubbers may be blended and used as the diene rubber. The content of the other diene rubber is at most 75 mass %, preferably at most 70 mass %, and more preferably at most 50 mass % relative to 100 mass % of the diene rubber. For example, the content is adjusted to 60 to 30 mass %.

A preferable example of a diene rubber other than the modified conjugated diene polymer rubber (a) is a modified conjugated diene polymer rubber (b). The modified conjugated diene polymer rubber (b) is a modified conjugated diene polymer rubber which is terminal-modified by a functional group with reactivity to silanol groups and has a specified aromatic vinyl unit content, vinyl unit content, glass transition temperature, weight average molecular weight (Mw), and ratio (Mw/Mn) of the weight average molecular weight (Mw) and the number average molecular weight (Mn). By blending the modified conjugated diene polymer rubber (b) into the rubber composition, it is possible to further reduce the rolling resistance of the rubber composition, to further increase the dry performance and wet performance, and to further improve the workability.

In the present technology, the content of the modified conjugated diene polymer rubber (b) is preferably from 40 to 75 mass % and more preferably from 45 to 70 mass % relative to 100 mass % of the diene rubber. When the content of the modified conjugated diene polymer rubber (b) is less than 40 mass %, it is not possible to sufficiently achieve the anticipated effects.

The modified conjugated diene polymer rubber (b) is preferably a solution polymerization styrene butadiene rubber (S-SBR).

The functional group of the modified conjugated diene polymer rubber (b) is a functional group with reactivity to silanol groups, and examples include alkoxysilyl groups, hydroxyl groups (including an organosiloxane structure), aldehyde groups, carboxyl groups, amino groups, imino groups, epoxy groups, amide groups, thiol groups, ether groups, and the like. When the terminal-modifying group is composed of a functional group having reactivity with silanol groups present on the silica surface, the affinity with silica is further increased, which makes it possible to dramatically improve the dispersibility.

The terminal-modified conjugated diene polymer rubber (b) has aromatic vinyl units, and the aromatic vinyl unit content is preferably from 25 to 40 mass % and more preferably from 27 to 37 mass %. When the aromatic vinyl unit content of the terminal-modified conjugated diene polymer rubber (b) is less than 25 mass %, the strength decreases, and the grip performance becomes insufficient. When the aromatic vinyl unit content of the terminal-modified conjugated diene polymer rubber (b) exceeds 40 mass %, the Tg becomes too high, and the wear resistance is deteriorated. The aromatic vinyl unit content of the modified conjugated diene polymer rubber (b) is measured by infrared spectrophotometric analysis (Hampton method).

The vinyl unit content of the terminal-modified conjugated diene polymer rubber (b) is preferably from 36 to 65 mass % and more preferably from 36 to 60 mass %. When the vinyl unit content of the terminal-modified conjugated diene polymer rubber (b) is less than 36 mass %, the Tg is low, and the grip performance becomes insufficient. When the vinyl unit content of the terminal-modified conjugated diene polymer rubber (b) exceeds 65 mass %, the strength decreases, and the wear resistance is deteriorated. The vinyl unit content of the modified conjugated diene polymer rubber (b) is measured by infrared spectrophotometric analysis (Hampton method).

The glass transition temperature (Tg) of the terminal-modified conjugated diene polymer rubber (b) is preferably from −40 to −22° C. and more preferably from −37 to −25° C. When the Tg of the terminal-modified conjugated diene polymer rubber (b) is within such a range, it is possible to secure the steering stability and to reduce the rolling resistance. The glass transition temperature (Tg) of the modified conjugated diene polymer rubber (b) is determined by measuring a thermogram by differential scanning calorimetry (DSC) under conditions with a rate of temperature increase of 20° C./min and then taking the temperature at the middle of the transition range. When the modified conjugated diene polymer rubber (b) is an oil-extended product, the glass transition temperature of the modified conjugated diene polymer rubber (b) in a state not containing an oil extension component (oil) is used.

The weight average molecular weight (Mw) of the terminal-modified conjugated diene polymer rubber (b) is preferably from 900,000 to 1,400,000 and more preferably from 900,000 to 1,300,000, and the molecular weight distribution, which is expressed as the ratio (Mw/Mn) of the weight average molecular weight (Mw) and the number average molecular weight (Mn), is preferably at least 2.3, and more preferably from 2.3 to 3.5. When the weight average molecular weight (Mw) of the terminal-modified conjugated diene polymer rubber (b) is less than 900,000, the strength decreases, and the grip performance is insufficient. When the weight average molecular weight (Mw) of the terminal-modified conjugated diene polymer rubber (b) exceeds 1,400,000, the viscosity becomes too high, and the workability is deteriorated. Furthermore, when the molecular weight distribution (Mw/Mn) is less than 2.3, the low viscosity components are reduced, and the workability is deteriorated. The weight average molecular weight (Mw) and the number average molecular weight (Mn) of the modified conjugated diene polymer rubber (b) are measured by gel permeation chromatography (GPC) in terms of standard polystyrene.

By containing an aromatic modified terpene resin, the rubber composition for a tire according to the present technology is able to further improve the wet performance and, in particular, the steering stability on wet road surfaces while maintaining low rolling resistance. The aromatic modified terpene resin that is used preferably has a softening point of 100 to 150° C. and more preferably 110 to 140° C. When the softening point of the aromatic modified terpene resin is less than 100° C., the effect of improving the wet performance cannot be sufficiently achieved. When the softening point of the aromatic modified terpene resin exceeds 150° C., the dispersibility with respect to the diene rubber diminishes, the grip performance on wet road surfaces decreases, and the rubber strength decreases. The softening point of the aromatic modified terpene resin is measured in accordance with JIS K6220-1 (ring and ball method).

The compounded amount of the aromatic modified terpene resin is preferably from 3 to 20 parts by mass and more preferably from 4 to 15 parts by mass relative to 100 parts by mass of the diene rubber. When the compounded amount of the aromatic modified terpene resin is less than 3 parts by mass, it is impossible to set the glass transition temperature of the rubber composition to a high level, and the effect of improving the wet grip performance cannot be sufficiently achieved. When the compounded amount of the aromatic modified terpene resin exceeds 20 parts by mass, in addition to the low rolling resistance or wear resistance being deteriorated, the adhesiveness of the rubber composition increases, and the molding workability or handleability is deteriorated due to adherence to the molding roller or the like.

An aromatic modified terpene resin is obtained by polymerizing a terpene and an aromatic compound. Examples of the terpene include α-pinene, β-pinene, dipentene, limonene, and the like. Examples of the aromatic compound include styrene, α-methylstyrene, vinyl toluene, indene, and the like. Of these, a styrene modified terpene resin is preferably used as an aromatic modified terpene resin. Such an aromatic modified terpene resin has good compatibility with the diene rubber, so the tan δ of the rubber composition at 0° C. is increased, and the wet grip performance improves.

The hydroxy value of the aromatic modified terpene resin is preferably at most 30 KOHmg/g and more preferably from 0 to 25 KOHmg/g. When the hydroxy value of the aromatic modified terpene resin is at most 30 KOHmg/g, the tan δ at 0° C. increases, and the wet grip performance improves. Note that the hydroxy value of the aromatic modified terpene resin is measured in accordance with JIS K1557-1.

The rubber composition for a tire according to the present technology contains an oil and/or an aromatic modified terpene resin. That is, the composition may contain an oil, an aromatic modified terpene resin, or both an oil and an aromatic modified terpene resin. The total amount of the oil and/or the aromatic modified terpene resin is preferably at most 40 parts by mass, and more preferably at most 39 parts by mass, per 100 parts by mass of the diene rubber. By setting the total amount of the oil and/or the aromatic modified terpene resin to at most 40 parts by mass, it is possible to secure high steering stability. The lower limit of the total amount of the oil and/or the aromatic modified terpene resin is not particularly limited but may be at least 20 parts by mass from the perspective of workability. Here, the oil in the rubber composition refers to the oil-extending oils contained in the modified conjugated diene polymer rubber (a), the modified conjugated diene polymer rubber (b), and other diene rubber, as well as all of the various oils (including softening agents) added at the time of the preparation of the rubber composition.

Silica is blended into the rubber composition for a tire according to the present technology in an amount of 90 to 150 parts by mass and preferably 95 to 150 parts by mass relative to 100 parts by mass of the diene rubber. For example, silica is blended into the composition in an amount of 90 to 120 parts by mass or 120 to 150 parts by mass. By blending silica into the composition within such a range, it is possible to balance the low rolling resistance and wet performance of the rubber composition at a higher level and to secure dry performance. When the compounded amount of silica is less than 90 parts by mass, the wet performance is deteriorated. When the compounded amount of the filler exceeds 150 parts by mass, the heat generation increases, and the low rolling resistance is deteriorated. When the modified conjugated diene polymer rubber (a) is blended into the composition of the present technology, the affinity with silica is increased and the dispersibility is improved, which makes it possible to further improve the effect of adding silica.

The silica used in the rubber composition of the present technology preferably has a nitrogen specific surface area ($N_2SA$) of 135 to 260 $m^2/g$, a CTAB specific surface area (CTAB) of 130 to 220 $m^2/g$, an $N_2SA$-to-CTAB ratio ($N_2SA/CTAB$) of 0.9 to 1.4, and a DBP absorption of at least 140 mL/100 g.

The nitrogen specific surface area ($N_2SA$) of the silica is preferably from 135 to 260 $m^2/g$, more preferably from 190 to 260 $m^2/g$, and even more preferably from 194 to 225 $m^2/g$. When the $N_2SA$ of silica is less than 135 $m^2/g$, the dry performance is deteriorated, which is not preferable. It is also not preferable that the $N_2SA$ of the silica exceed 260 $m^2/g$ because mixability will be negatively affected and mixing will become uneven, which will result in a stable rubber material being unobtainable. The $N_2SA$ of the silica is determined in accordance with JIS K6217-2.

The CTAB specific surface area (CTAB) of the silica is preferably from 130 to 220 $m^2/g$, more preferably from 170 to 210 $m^2/g$, and even more preferably from 185 to 205 $m^2/g$. When the CTAB of the silica is less than 130 $m^2/g$, the dry performance is deteriorated, which is not preferable. It is also not preferable that the CTAB of the silica exceeds 220 $m^2/g$ because the rolling resistance will worsen. The CTAB of the silica is determined in accordance with JIS K6217-3.

The $N_2SA$-to-CTAB ratio ($N_2SA/CTAB$) of the silica is preferably from 0.9 to 1.4 and more preferably from 1.0 to 1.3. If the characteristic ratio of the silica ($N_2SA/CTAB$) is less than 0.9, reinforcement properties will decline. If the characteristic ratio of the silica ($N_2SA/CTAB$) exceeds 1.4, the dispersibility of the silica will decline and the rolling resistance will worsen.

The DBP absorption of the silica is preferably at least 140 mL/100 g, more preferably at least 185 mL/100 g, and even more preferably 190 mL/100 g. When the DBP absorption is less than 140 mL/100 g, the tensile breaking strength is reduced. The upper limit of the DBP absorption is not particularly limited but is preferably at most 250 mL/100 g. When the DBP absorption exceeds 250 mL/100 g, the viscosity increases, and the workability is deteriorated. The DBP absorption number of the silica is calculated in accordance with Oil Absorption Number Method A described in JIS K6217-4.

In the present technology, another silica may also be used in addition to a specific silica having the colloidal characteristics described above, that is, a specific silica having an $N_2SA$ of 135 to 260 $m^2/g$, a CTAB of 130 to 220 $m^2/g$, a ratio ($N_2SA/CTAB$) of 0.9 to 1.4, and a DBP absorption of 140 mL/100 g or greater. The other silica is a silica that fails to satisfy at least one of the four colloidal characteristics described above.

The content of the specific silica described above in 100 mass % of the silica is preferably from 30 to 100 mass % and more preferably from 40 to 100 mass %. When the content of the specific silica is less than 30 mass %, the reinforcement properties are reduced, and the wear resistance or dry performance is deteriorated.

The silica that is used may be a silica that is ordinarily used in rubber compositions for tires such as, for example, wet silica, dry silica, surface-treated silica, or the like.

In the rubber composition of the present technology, a silane coupling agent is blended together with the silica so as to improve the dispersibility of the silica and to further increase the reinforcement properties with the diene rubber. The silane coupling agent is preferably blended in an amount of 3 to 20 mass % and more preferably 5 to 15 mass % relative to the compounded amount of the silica. For example, the silane coupling agent is blended in an amount of 5 to 8 mass % or 8 to 15 mass %. When the compounded amount of the silane coupling agent is less than 3 mass % of the silica weight, the effect of improving the dispersibility of the silica cannot be sufficiently achieved. When the amount of the silane coupling agents exceeds 20 mass %, the silane coupling agents are condensed with one another, which makes it impossible to achieve the desired effect.

The silane coupling agent is not particularly limited, but a sulfur-containing silane coupling agent is preferable, and examples include bis-(3-triethoxysilylpropyl)tetrasulfide, bis(3-triethoxysilylpropyl)disulfide, 3-trimethoxysilylpropylbenzothiazoltetrasulfide, γ-mercaptopropyltriethoxysilane, 3-octanoylthiopropyltriethoxysilane, and the like. Of these, bis-(3-triethoxysilylpropyl)tetrasulfide and bis(3-triethoxysilylpropyl)disulfide are preferable.

The rubber composition for a tire according to the present technology necessarily contains an alkyltriethoxysilane having an alkyl group with 7 to 20 carbons. This alkyltriethoxysilane is a silane compound represented by formula (VIII) below.

[Formula 10]

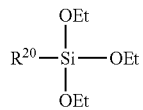

(VIII)

In formula (VIII), $R^{20}$ is an alkyl group having from 7 to 20 carbons, and OEt is an ethoxy group.

Specific examples of the alkyl group having from 7 to 20 carbons represented by $R^{20}$ include heptyl groups, octyl groups, nonyl groups, decyl groups, undecyl groups, dodecyl groups, and the like. Of these, alkyl groups having from 8 to 10 carbons are preferable, and octyl groups and nonyl groups are more preferable in order to achieve compatibility with the diene rubber.

In the present technology, by blending an alkyltriethoxysilane into the composition, it is possible to suppress the agglutination or viscosity increase of the silica and to produce a tire with excellent wet performance and rolling resistance. In particular, it is possible to produce a tire with excellent workability by suppressing increases in the viscosity of the rubber composition.

The reason for this is not clear, but it may be due to the fact that an alkyltriethoxysilane having from 7 to 20 carbons improves the dispersibility of the silica by accelerating the reaction (silanization) between the silica and the silane coupling agent. This is thought to suppress increases in viscosity by acting on the reaction between the modified conjugated diene polymer rubber (a) and the modified conjugated diene polymer rubber (b) and the silane coupling agent serving as optional components.

The compounded amount of the alkyltriethoxysilane having from 7 to 20 carbons is from 0.1 to 20 mass %, preferably from 0.5 to 10 mass %, and more preferably from 1 to 6 mass % relative to the compounded amount of the silica. For example, the compounded amount is from 1 to 3 mass % or from 3 to 6 mass %. When the compounded amount of the alkyltriethoxysilane is within such a range, not only does the dispersibility of the silica improve, resulting in good rolling resistance, but increases in the viscosity of the rubber composition are also simultaneously suppressed, which makes it possible to maintain good workability even when a large amount of silica is blended, and also makes it possible to improve the good dry performance and wet performance.

Fillers other than silica may also be blended into the rubber composition for a tire according to the present technology. Examples of such fillers other than the silica include, carbon black, clay, mica, talc, calcium carbonate, aluminum hydroxide, aluminum oxide, titanium oxide, and the like. Among these, carbon black is preferable. The rubber strength can be increased by blending carbon black.

Various compounding agents typically used in rubber compositions for tires such as a vulcanization agent or a crosslinking agent, a vulcanization accelerator, an antioxidant, a plasticizer, a processing aid, a liquid polymer, and a thermosetting resin can be blended into the rubber composition for a tire.

These compounding agents can be kneaded by a common method to obtain a rubber composition that can then be used for vulcanization or crosslinking. These compounding agents can be blended at conventional general amounts so long as the objects of the present technology are not hindered. The rubber composition for a tire can be produced by mixing each of the components described above using a well-known rubber kneading machine such as a Banbury mixer, a kneader, and a roller.

The rubber composition for a tire according to the present technology can be suitably used for a pneumatic tire. A pneumatic tire which uses this rubber composition in the tread part can improve low rolling resistance, wet performance, and dry performance so as to surpass conventional levels. In addition, the rubber composition according to the present technology has excellent workability, so a pneumatic tire having the excellent performance described above can be produced stably while maintaining high quality.

The present technology is further described below by examples. However, the scope of the present technology is not limited to these examples.

EXAMPLES

Twenty-nine types of rubber compositions for tires composed of the compositions indicated in FIGS. 1 to 3 (Working Examples 1 to 17 and Comparative Examples 1 to 12) were prepared by kneading the components (excluding sulfur and a vulcanization accelerator) with the common components shown in FIG. 4 for 5 minutes at 160° C. with a 1.8 L closed-type mixer, discharging the mixture (master batch), adding sulfur and a vulcanization accelerator to the master batch, and kneading the mixture with an open roller. In FIGS. 1 to 3, the net compounded amount of each rubber component is indicated in parentheses for the SBR containing an oil-extending oil. In addition, the compounded amounts of the aroma oil and the aromatic modified terpene resin were adjusted so that the total amount of the oil-extending oil and aroma oil in the SBR and the aromatic modified terpene resin was 30 parts by mass or 40 parts by mass relative to 100 parts by mass of the diene rubber. The total amounts of the oil-extending oil, aroma oil, and aromatic modified terpene resin are shown in the "(oil amount+resin amount)" section of FIGS. 1 to 3.

The workability of the 29 types of obtained rubber compositions for tires was evaluated by measuring the Mooney viscosity with the method indicated below.
Workability (Mooney Viscosity)

The Mooney viscosity of the obtained rubber composition was measured in accordance with JIS K6300 using a Mooney viscometer with an L-type rotor (diameter: 38.1 mm, thickness: 5.5 mm) under conditions with a preheating time of 1 minute, a rotor rotation time of 4 minutes, a temperature of 100° C., and a revolution speed of 2 rpm. The obtained results are shown in FIGS. 1 to 3 as indices in which the value of Comparative Example 1 is designated as 100. Smaller values of this index mean that the viscosity is smaller and the workability is better.

The obtained 29 types of rubber compositions for tires were press-vulcanized for 20 minutes at 160° C. in a die with a prescribed shape so as to produce vulcanized rubber samples, and the rolling resistance (tan δ at 60° C.) was evaluated using the method indicated below.

Rolling Resistance (tan δ at 60° C.)

The rolling resistance of the obtained vulcanized rubber samples was evaluated by the loss tangent tan δ (60° C.), which is a known index of heat generation. The tan δ (60° C.) was measured using a viscoelastic spectrometer (manufactured by Toyo Seiki Seisaku-sho, Ltd.) under the following conditions: 10% initial distortion, ±2% amplitude, 20 Hz frequency, and 60° C. temperature. The obtained results are shown in FIGS. 1 to 3 as indices in which the value of Comparative Example 1 is designated as 100. Smaller values of the index of tan δ (60° C.) (in particular, when the index is 98 or lower) indicate that the heat generation is small and that a resulting pneumatic tire has small rolling resistance and excellent fuel efficiency performance.

Next, sets of four pneumatic tires having tire sizes of 245/50R18 were produced. In each of the sets of four tires, one of the 29 types of rubber compositions for use in tires described above was used in the tread portion. The wet performance and dry performance of the obtained 29 types of pneumatic tires were evaluated using the methods indicated below.

Wet Performance

The obtained pneumatic tires were mounted on a 2.5-liter class test vehicle made in Japan by attaching the tires to wheels having a rim size of 18×8JJ, and the vehicle was driven on a test course of 2.6 km per circuit consisting of a wet road surface under conditions with a pneumatic pressure of 230 kPa. The steering stability at this time was scored by three expert panelists by means of sensory evaluation. The obtained results are shown in FIGS. 1 to 3 as indices in which the value of Comparative Example 1 is designated as 100. A larger value of this index (in particular, when the index is 102 or higher) means that the wet steering stability on wet road surfaces is excellent.

Dry Performance

The obtained pneumatic tires were mounted on a 2.5-liter class test vehicle made in Japan by attaching the tires to wheels having a rim size of 18×8JJ, and the vehicle was driven on a test course of 2.6 km per circuit consisting of a dry road surface under conditions with a pneumatic pressure of 230 kPa. The steering stability at this time was scored by three expert panelists by means of sensory evaluation. The obtained results are shown in FIGS. 1 to 3 as indices in which the value of Comparative Example 1 is designated as 100. A larger value of this index (in particular, when the index is 102 or higher) means that the dry steering stability on dry road surfaces is excellent.

The types of raw materials used in FIGS. 1 to 3 are indicated below.

Modified S-SBR (a) 1: modified conjugated diene polymer rubber (a) comprising a polyorganosiloxane having the structure of general formula (I) described above (in formula (I), m=80, n=0, k=120, $X^1$, $X^4$, $R^1$ to $R^3$, and $R^5$ to $R^8$ are respectively methyl groups (—$CH_3$), and $X^2$ is a 3-glycidoxypropyl group); aromatic vinyl unit content: 42 mass %; vinyl unit content: 32 mass %; weight average molecular weight (Mw): 750,000; Tg: −25° C.; oil-extended product containing 25 parts by mass of an oil relative to 100 parts by mass of the rubber component; NS570 manufactured by Zeon Corporation Modified S-SBR (a) 2: modified conjugated diene polymer rubber (a) having a siloxane structure in at least some terminal-modifying groups; aromatic vinyl unit content: 23 mass %; vinyl unit content: 70 mass %; weight average molecular weight (Mw): 510,000; Tg: −22° C.; non-oil-extended product; NS616 manufactured by Zeon Corporation Modified S-SBR (b) 3: modified conjugated diene polymer rubber (b) having functional groups with reactivity to silanol groups at the terminals; aromatic vinyl unit content: 37 mass %; vinyl unit content: 42 mass %; weight average molecular weight (Mw): 1,260,000; molecular weight distribution (Mw/Mn): 2.2; Tg: −27° C.; oil-extended product containing 37.5 parts by mass of an oil relative to 100 parts by mass of the rubber component; E581 manufactured by Asahi Kasei Chemicals Corporation Modified S-SBR (b) 4: modified conjugated diene polymer rubber (b) having functional groups with reactivity to silanol groups at the terminals; aromatic vinyl unit content: 37 mass %; vinyl unit content: 42 mass %; weight average molecular weight (Mw): 1,150,000; molecular weight distribution (Mw/Mn): 2.5; Tg: −° C.; oil-extended product containing 37.5 parts by mass of an oil relative to 100 parts by mass of the rubber component; F4850 manufactured by Asahi Kasei Chemicals Corporation S-SBR: unmodified solution polymerization styrene-butadiene rubber; aromatic vinyl unit content: 39 mass %; vinyl unit content: 42 mass %; weight average molecular weight (Mw): 960,000; Tg: −23° C.; NS522 manufactured by Zeon Corporation; oil-extended product containing 37.5 parts by mass of an oil relative to 100 parts by mass of the rubber component E-SBR: unmodified emulsion polymerization styrene-butadiene rubber; aromatic vinyl unit content: 41 mass %; vinyl unit content: 14 mass %; weight average molecular weight (Mw): 760,000; Tg: −28° C.; Nipol 1739 manufactured by Zeon Corporation; oil-extended product containing 37.5 parts by mass of an oil relative to 100 parts by mass of the rubber component BR: butadiene rubber; Nipol BR1220 manufactured by Zeon Corporation Aroma oil: Extract 4S manufactured by Showa Shell Seikyu K.K.

Silica 1: Zeosil 1165 MP manufactured by Rhodia; DBP absorption: 200 mL/100 g; nitrogen specific surface area ($N_2SA$): 160 $m^2/g$; CTAB specific surface area (CTAB): 159 $m^2/g$; $N_2SA$/CTAB: 1.01

Silica 2: Zeosil Premium 200 MP manufactured by Rhodia; DBP absorption: 203 mL/100 g; nitrogen specific surface area ($N_2SA$): 200 $m^2/g$; CTAB specific surface area (CTAB): 197 $m^2/g$; $N_2SA$/CTAB: 1.02

Carbon black: SEAST KH manufactured by Tokai Carbon Co., Ltd.

Coupling agent: bis(3-triethoxysilylpropyl)tetrasulfide; Si69 manufactured by Evonik Degussa Terpene resin: aromatic modified terpene resin with a softening point of 125° C.; YS resin TO-125 manufactured by Yasuhara Chemical Co., Ltd.

Alkyl silane 1: dimethyldiethoxysilane; KBE-22 manufactured by Shin-Etsu Chemical Co., Ltd.

Alkyl silane 2: octyltriethoxysilane; KBE-3083 manufactured by Shin-Etsu Chemical Co., Ltd.

The types of raw materials used in the common components of FIG. 4 are indicated below. The compounded amounts in FIG. 4 indicate the compounded amounts [parts by mass] relative to 100 parts by mass of the diene rubber indicated in FIGS. 1 to 3.

Stearic acid: stearic acid beads manufactured by Chiba Fatty Acid Co., Ltd.

Antioxidant: Antigen 6C manufactured by Sumitomo Chemical Co., Ltd.

Wax: SANNOC manufactured by Ouchi Shinko Chemical Industrial Co., Ltd.

Zinc oxide: three types of zinc oxide manufactured by Seido Chemical Industry Co., Ltd.

Sulfur: "Golden Flower" oil-treated sulfur powder manufactured by Tsurumi Chemical Industry Co., Ltd.

Vulcanization Accelerator 1: Vulcanization accelerator CBS; Nocceler CZ-G manufactured by Ouchi Shinko Chemical Industrial Co., Ltd.

Vulcanization Accelerator 2: Vulcanization accelerator DPG; Nocceler D manufactured by Ouchi Shinko Chemical Industrial Co., Ltd.

As is clear from FIGS. 1 to 3, it was confirmed that the rubber compositions for tires according to Working Examples 1 to 17 exhibit improved low rolling resistance (tan δ at 60° C.), wet performance (tan δ at 0° C.), and dry performance as well as improved workability (Mooney viscosity).

As is clear from FIG. 1, the compounded amount of alkyltriethoxysilane in the rubber composition of Comparative Example 9 exceeds 20 mass % relative to the amount of silica, so the dry performance cannot be improved.

As is clear from FIG. 2, the rubber composition of Comparative Example 10 does not contain a silane coupling agent, so the workability, dry performance, and rolling resistance are dramatically deteriorated. The compounded amount of the silane coupling agent in the rubber composition of Comparative Example 11 is less than 3 mass % relative to the amount of silica, so the workability is deteriorated and the dry performance and rolling resistance cannot be improved. The compounded amount of the silane coupling agent in the rubber composition of Comparative Example 12 exceeds 20 mass % relative to the amount of silica, so the workability, dry performance, and rolling resistance cannot be improved.

As is clear from FIG. 3, the rubber composition of Comparative Example 2 does not contain the modified conjugated diene polymer rubber (a) but contains an unmodified S-SBR, so the workability and low rolling resistance (tan δ at 60° C.) are deteriorated. The rubber composition of Comparative Example 3 contains an unmodified E-SBR instead of a modified conjugated diene polymer rubber, so the dry performance, wet performance, and rolling resistance are deteriorated. The compounded amount of the modified S-SBR1 in the rubber composition of Comparative Example 4 is less than 30 mass % relative to 100 mass % of the diene rubber, so the dry performance, wet performance, and rolling resistance cannot be sufficiently improved. The rubber composition of Comparative Example 5 does not contain an alkyltriethoxysilane having from 7 to 20 carbons, so the workability is greatly deteriorated, and the wet stability and rolling resistance cannot be improved.

The rubber composition of Comparative Example 6 contains a dimethyldiethoxysilane instead of an alkyltriethoxysilane having from 7 to 20 carbons, so the workability is deteriorated, and the dry performance cannot be sufficiently improved. The compounded amount of the silica in the rubber composition of Comparative Example 7 is less than 90 parts by mass, so the dry performance and wet performance are deteriorated. The compounded amount of the silica in the rubber composition of Comparative Example 8 exceeds 150 parts by mass, so the workability and rolling resistance are deteriorated.

The invention claimed is:

1. A rubber composition for a tire, the rubber composition comprising: silica being blended in an amount of 90 to 150 parts by weight per 100 parts by weight of a diene rubber containing at least 25 wt. % of a modified conjugated diene polymer rubber (a) having a siloxane structure in at least some terminal-modifying groups, and from 40 to 75 wt. % of a terminal-modified conjugated diene polymer rubber (b) being a terminal-modified conjugated diene polymer rubber other than the modified conjugated diene polymer rubber (a) and having a functional group with reactivity to silanol groups;

a silane coupling agent being blended in an amount of 3 to 20 wt. % relative to the amount of silica; and an alkyltriethoxysilane having an alkyl group with 7 to 20 carbons, and being blended in an amount of 0.1 to 20 wt. % relative to the amount of silica;

the modified conjugated diene polymer rubber (a) having a weight average molecular weight (Mw) of 600,000 to 1,000,000; and the terminal-modified conjugated diene polymer rubber (b) having an aromatic vinyl unit content of 25 to 40 wt. %, a vinyl unit content of 36 to 65 wt. %, a glass transition temperature of −40 to −22° C., a weight average molecular weight (Mw) of 900,000 to 1,400,000, and a ratio (Mw/Mn) of the weight average molecular weight (Mw) and a number average molecular weight (Mn) of at least 2.3.

2. The rubber composition for a tire according to claim 1, wherein the terminal modifying groups are groups generated by bonding at least one compound having a siloxane structure to active terminals of an active conjugated diene polymer chain, wherein the at least one compound having a siloxane structure has a general structure according to formula (I) below:

[Formula I]

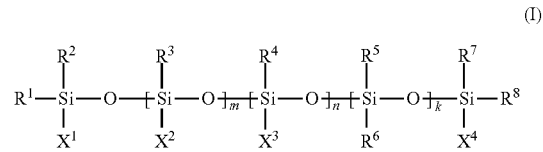

wherein, $R^1$ to $R^8$ are identical and are alkyl groups having from 1 to 6 carbons; $X^1$ and $X^4$ are identical and are alkyl groups having from 1 to 6 carbons; $X^2$ is a group having a functional group that reacts with the active terminal of the active conjugated diene polymer chain; $X^3$ is a group including from 2 to 20 repeating alkylene glycol units; and m is an integer from 3 to 200, n is an integer from 0 to 200, and k is an integer from 0 to 200.

3. The rubber composition for a tire according to claim 2, wherein the modified conjugated diene polymer rubber (a) has aromatic vinyl units; the content of the aromatic vinyl units is from 15 to 48 wt. %.

4. The rubber composition for a tire according to claim 3, wherein the silica has a nitrogen specific surface area ($N_2SA$) of 194 to 225 $m^2/g$, a CTAB specific surface area (CTAB) of 170 to 210 $m^2/g$, a DBP absorption of at least 190 mL/100 g, and an $N_2SA$-to-CTAB ratio ($N_2SA/CTAB$) of 0.9 to 1.4.

5. The rubber composition for a tire according to claim 4, wherein an aromatic modified terpene resin having a softening point of 100 to 150° C. is blended in an amount of 3 to 5 parts by weight per 100 parts by weight of the diene rubber.

6. The rubber composition for a tire according to claim 5, wherein the rubber composition contains an oil and the aromatic modified terpene resin; and the total content of the oil and the aromatic modified terpene resin in the rubber composition is at most 40 parts by mass per 100 parts by mass of the diene rubber.

7. A pneumatic tire comprising the rubber composition for a tire described in claim 6.

8. The rubber composition for a tire according to claim 2, wherein $X^2$ is an epoxy group-containing group having from 4 to 12 carbons.

9. The rubber composition for a tire according to claim 2, wherein $X^2$ is represented by formula (V): ZYE
   wherein, Z is an alkylene group having from 1 to 10 carbons; Y is an oxygen atom; and E is a glycidyl group.

10. The rubber composition for a tire according to claim 1, wherein the modified conjugated diene polymer rubber (a) has aromatic vinyl units; the content of the aromatic vinyl units is from 15 to 48 wt. %.

11. The rubber composition for a tire according to claim 1, wherein the silica has a nitrogen specific surface area ($N_2SA$) of 194 to 225 m²/g, a CTAB specific surface area (CTAB) of 170 to 210 m²/g, a DBP absorption of at least 190 mL/100 g, and an $N_2SA$-to-CTAB ratio ($N_2SA/CTAB$) of 0.9 to 1.4.

12. The rubber composition for a tire according to claim 1, wherein an aromatic modified terpene resin having a softening point of 100 to 150° C. is blended in an amount of 3 to 5 parts by weight per 100 parts by weight of the diene rubber.

13. The rubber composition for a tire according to claim 1, wherein the rubber composition contains an oil and/or an aromatic modified terpene resin; and the total content of the oil and/or aromatic modified terpene resin in the rubber composition is at most 40 parts by weight per 100 parts by weight of the diene rubber.

14. A pneumatic tire comprising the rubber composition for a tire described in claim 1.

15. The rubber composition for a tire according to claim 1, wherein the siloxane structure is a structure originating from at least one type of a siloxane compound selected from general formulas (I) to (III) below:

[Formula I]

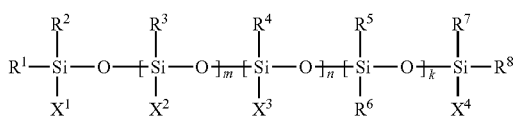
(I)

wherein, $R^1$ to $R^8$ are different and are aryl groups having from 6 to 12 carbons; $X^1$ and $X^4$ are different and are groups having functional groups that react with an active terminal of the active conjugated diene polymer chain, or aryl groups having from 6 to 12 carbons; $X^2$ is a group having a functional group that reacts with the active terminal of the active conjugated diene polymer chain; $X^3$ is a group including from 2 to 20 repeating alkylene glycol units, a portion of the $X^3$ moieties optionally being groups derived from groups including from 2 to 20 repeating alkylene glycol units; and m is an integer from 3 to 200, n is an integer from 0 to 200, and k is an integer from 0 to 200;

[Formula II]

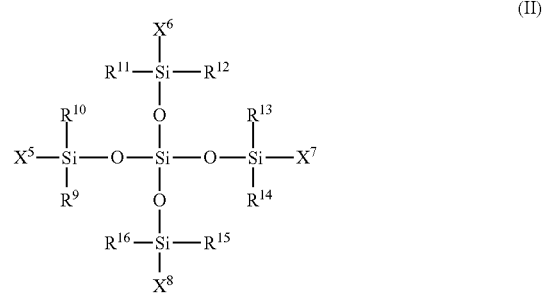
(II)

wherein, $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain;

[Formula III]

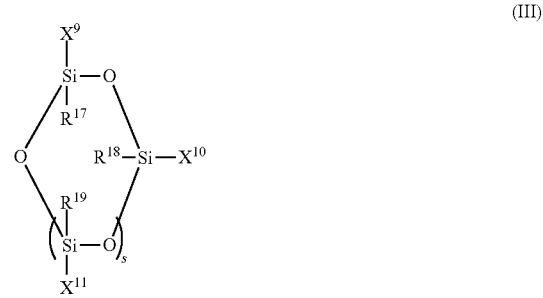
(III)

wherein, $R^{17}$ to $R^{19}$ are identical or different and are alkyl groups having from 1 to 6 carbons or aryl groups having from 6 to 12 carbons; $X^9$ to $X^{11}$ are groups having functional groups that react with the active terminal of the active conjugated diene polymer chain; and s is an integer from 1 to 18.

16. The rubber composition for a tire according to claim 15, wherein $X^2$ is represented by formula (V): ZYE
   wherein, Z is an alkylene group or an alkyl arylene group having from 1 to 10 carbons; Y is a methylene group, a sulfur atom, or an oxygen atom; and E is an epoxy group-containing hydrocarbon group having from 2 to 10 carbons.

* * * * *